July 3, 1956          E. WILDHABER          2,752,766
LAMINATED MOUNTING AND CONNECTION, ESPECIALLY
FOR UNIVERSAL JOINTS
Filed April 4, 1952          4 Sheets-Sheet 2

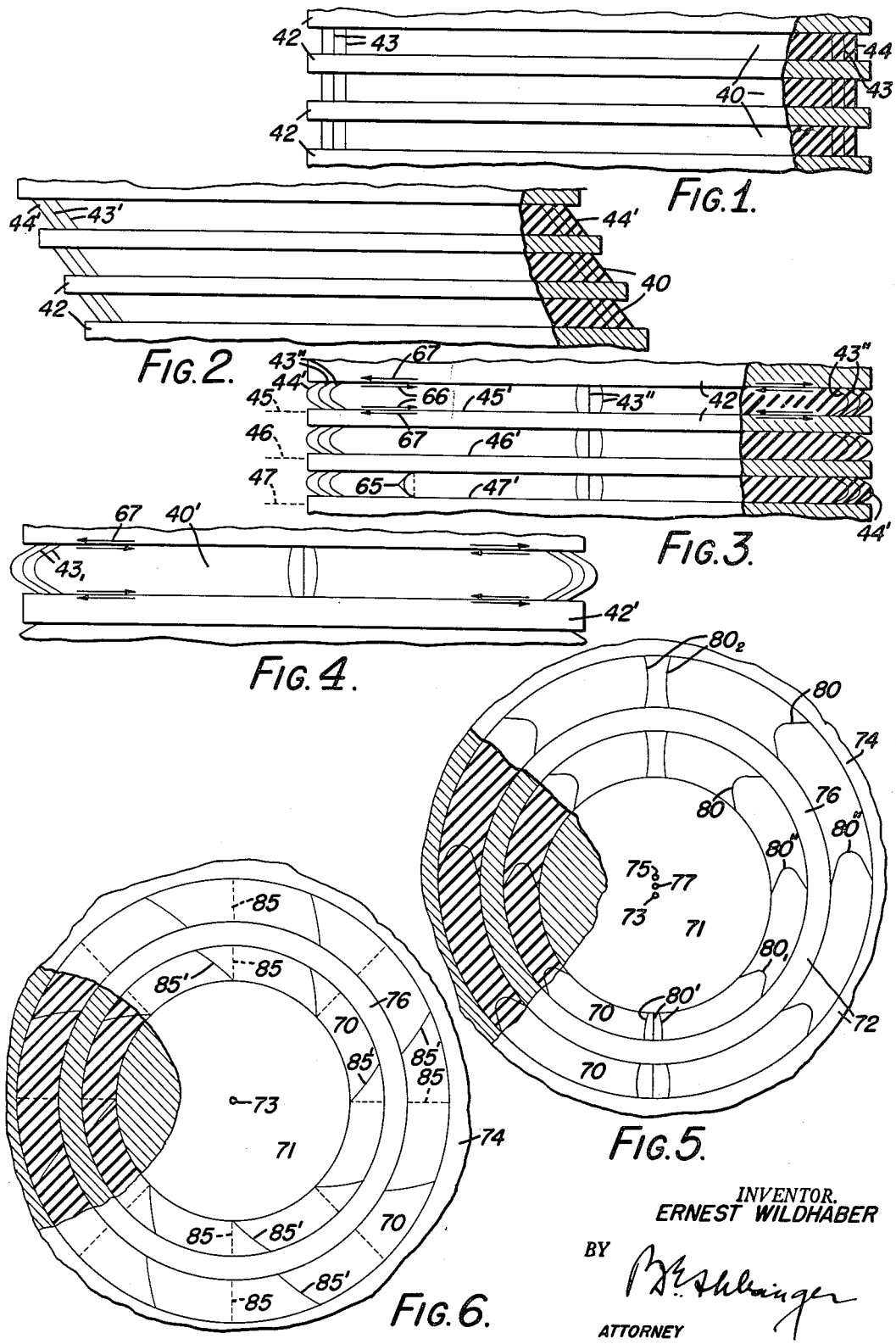

INVENTOR.
ERNEST WILDHABER
BY
ATTORNEY

INVENTOR.
ERNEST WILDHABER
BY
ATTORNEY

July 3, 1956 — E. WILDHABER — 2,752,766
LAMINATED MOUNTING AND CONNECTION, ESPECIALLY FOR UNIVERSAL JOINTS
Filed April 4, 1952 — 4 Sheets-Sheet 4

INVENTOR.
ERNEST WILDHABER
BY
ATTORNEY

United States Patent Office 2,752,766
Patented July 3, 1956

2,752,766

LAMINATED MOUNTING AND CONNECTION, ESPECIALLY FOR UNIVERSAL JOINTS

Ernest Wildhaber, Rochester, N. Y.

Application April 4, 1952, Serial No. 280,538

6 Claims. (Cl. 64—11)

The present invention relates to resilient mountings and connecting means, and especially to a universal joint incorporating resilient means for connecting, and transmitting the load between the two end members of the joint. In a still more specific aspect the invention relates to a stratified or interleaved type mounting or connection having alternate rigid layers and layers of rubber or rubber-like material.

One object of the present invention is to provide improved resilient supporting and connecting means adapted to carry larger loads than hitherto feasible with resilient supporting and connecting means.

A further object of the invention is to provide improved stratified-type resilient mountings and connections capable of carrying larger loads than heretofore possible with such constructions.

Another object of the invention is to provide a pivotal connection of the stratified or interleaved type adapted to transmit a main load substantially radial of the pivot axis.

Another object of the invention is to provide a universal joint in which the end members of the joint are connected through a stratified type connection, and especially a universal joint containing an end member with a plurality of pivot axes extending radially of its axis of rotation, which is connected through intermediate resilient and yielding parts, and particularly through stratified type resilient and yielding parts, with the other end of the joint.

Still another object of the invention is to provide a universal joint in which the end members of the joint are connected through circularly stratified connections that are mounted on pivot pins on one end member and having sliding engagement with the other end member.

Other objects of the invention will be apparent hereinafter from the specification and from the recital of the appended claims.

In the drawings:

Figs. 1 to 4 inclusive are diagrams explanatory of the nature of the improved resilient and yielding mountings and connections used in the present invention;

Figs. 5 and 6 are diagrammatic views illustrative of a preferred embodiment of the invention in which the strata extends about an axis and covers the entire circumference thereof;

Figure 32:
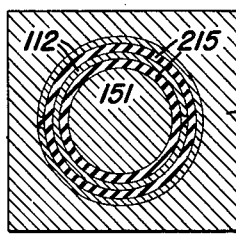
Figure 33:
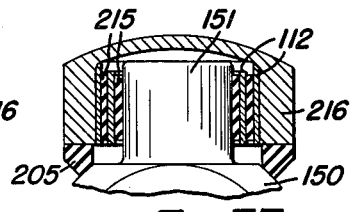
Figure 30:
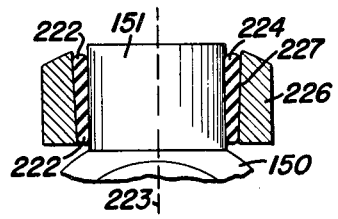
Figure 25:
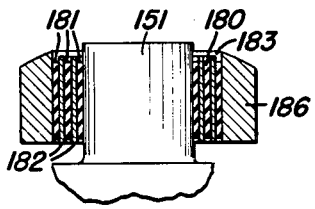
Fig. 25 is a section on the line 25—25 of Fig. 24.
Figure 28:
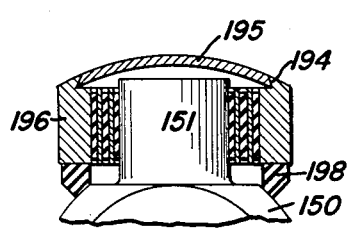
Figs. 28 and 29 are axial sections, similar to Fig. 25, of further modifications of the invention.
Figure 29:
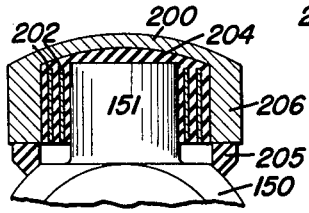
Figure 31:
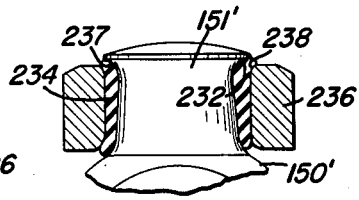

Figs. 30 and 31 are axial sections, similar to Figs. 25, 28 and 29, showing a sliding block constructed according to a further modification of the present invention; and Figs. 32 and 33 are fragmentary sections through the pivot portion and an axial section at right angles thereto, respectively, showing a stratified sleeve and a part mounted thereon, such as a sliding block, and illustrating a further modification of the invention.

In the present invention the resilient mounting or connection comprises laminations in which layers of a resilient and yielding material, such as natural or synthetic rubber, alternate with relatively rigid layers made, for instance, of metal, the different layers being bonded together. The resilient connection or support is put to use in a way to transmit the main load in a direction perpendicular to the layers. Various forms of my resilient support or connecting means are disclosed in the present application. These, and their uses, depend on the concept of the resilient support or connection, on how it works, how it can be loaded, and the knowledge of what its limitations are, how it should be proportioned and used. This concept and knowledge will be disclosed here as they are essential to an understanding of the invention.

Heretofore it has been assumed in any resilient laminated mounting or connection that the function of the relatively rigid layers is to prevent buckling of the rubber layers, and that their use enables the rubber to carry the loads which it normally should carry under conditions approaching static conditions. The term "rubber" is used here broadly to designate a yielding substance.

It will be shown here that such alternating layers bonded together in effect constitute a new and useful composite material with properties quite different from those of the component parts and especially from those of the rubber. It will be shown that the load-carrying capacity in a direction perpendicular to the rubber layers can be increased many times through laminations, while the yielding capacity in that direction is correspondingly reduced. That is to say, a given thickness of rubber loses its resilience increasingly with the increased number of layers into which it is split up. At the same time its load capacity in that direction increases proportionately. However, the yield in a direction along the layers is almost completely unaffected by the laminations and is essentially the same whether the rubber is in one piece or in layers separated by relatively rigid layers of strong material. Here then we have a composite material which is yielding in two directions, the directions of the layers, and is much less yielding and much stronger in a direction perpendicular thereto. The strength and yielding capacity in the latter direction can be controlled by the design of the laminations. It is possible and usually desirable to have a load capacity in the latter direction larger than that of rubber and especially much larger than the one of the soft rubber preferably used. This phenomenon is the result of hydraulic pressures developed in the rubber layers.

Fig. 1 shows a support or connecting means composed of a plurality of rubber layers 40 and of layers 42 of a relatively rigid material bonded together. They are shown here in the unstressed state. The layers 42 are made of as strong a material as possible compatible with cost. The rigidity is unimportant; it is the strength that counts. Hardened steel and steel alloys may be used. However, nylon sheets, among the non-metals such as plastics, have outstanding strength and may be used also.

Fig. 2 shows the layers displaced relatively in the direction of the layers, producing some shear stress. For convenience in illustration, there are some lines 43 shown in Fig. 1 perpendicular to the layers 40 and 42 and parallel to the end surfaces 44 of the layers. In the displaced position of Fig. 2 these lines appear as 43'. They are slanted and parallel to the displaced ends 44' of the rubber layers. The lines 43' would be equally slanted at the same relative position of the end plates if instead of the three rubber layers shown a single layer were to be used of a thickness equal to the aggregate thickness of the three layers. Similarly the shear stress would be the same. In other words, the laminated material is as soft laterally as a single rubber pad of a thickness equal to the aggregate thicknesses of the layers 40.

Fig. 3 illustrates what happens when the material is compressed in a direction perpendicular to the layers. Here the upper surfaces of the rigid laminations 42 have been moved from planes, such as 45, 46 and 47, indicated in dotted lines in Fig. 3, to positions 45', 46' and 47', respectively. Inasmuch as rubber is nearly incompressible in volume, it tends to escape laterally so that the ends of the rubber layers now bulge out as denoted at 44'. The lines 43 now show up as curves 43" which bulge out increasingly the closer they are to the ends 44'. At the middle they are nearly straight. The figures indicate simple basic stresses. Other stresses can be obtained by combination.

Let us first consider the simplest problem, namely, the plane problem, where all the displacements of the rubber particles in a given plane stay in that plane. This may be the plane of the drawing or any plane parallel to it. While this is really an abstraction, such a condition may be approached when the dimension at right angles to the drawing plane is very large, that is, when the length of the layers is very large. This condition is reached when the length is infinitely large.

The problem may further be simplified by assuming that the rubber is incompressible in volume, a condition which is approximately fulfilled. The volume of each bulge per unit of length is then equal to the volume displaced between the buldge and the center. It is proportional to the distance of the bulge from the center and of course to the displacement. The inclination of the line 43" (Fig. 3) is largest adjacent the junction between the rubber and the relatively rigid layer 42, that is, adjacent the bond. It increases with the distance from the center.

Many years ago a theory and concept of elasticity was advanced which considers the stresses in all directions; and it was concluded that the shear stresses are the stresses which really tax a material and tend to destroy it, while compressive stresses are not harmful if applied from all directions. Fluid pressure is applied from all directions; and hence it is not harmful to the material. Pressure in one direction, or tension in one direction, also results in shear stresses in an oblique direction. It is harmful if excessive. This concept has been confirmed in practice through the years. It is this concept that we shall apply to the stress condition of Fig. 3.

Figure 7:
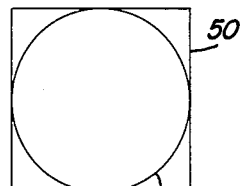
Figs. 7 and 8 are diagrams explanatory of the stresses set up in the layers or strata under pressure.
Figure 8:
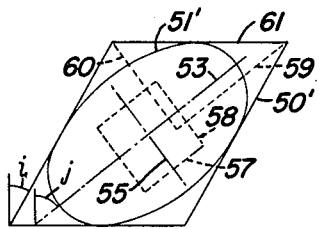

Very small particles of the rubber elements thereof are considered. In the unstressed state such an element may be a square 50 (Fig. 7) or a circle 51. Fig. 8 shows the shape of such an element under stress, particularly of an element of Fig. 3 immediately adjacent the bond. What was a square has become a parallelogram 50' of the same height and volume as the square; and what was a circle has become an ellipse 51'. The ellipse contacts the straight sides of the parallelogram at their centers just the same as the circle 51 contacts the straight side of the square 50 at their centers. Fig. 3 denotes the major axis of the ellipse. At a given inclination of the sides of the parallelogram the ellipse can be determined in known manner by drawing or computation.

The stress set up by this deformation is a tensile stress in the direction of the major axis 53 of the ellipse. It is proportional to a constant which characterizes the material. It is a function of the length of the ellipse along the axis 53 in proportion to the diameter of the circle 51 or to the width of the ellipse along its minor axis 55. That is, it is a function of $$\frac{2a}{2b}$$

where $2a$ denotes the length of the ellipse along its major axis 53, and where $2b$ is the width of the ellipse along its minor axis 55. This function may be established by a test where it is not already known. The tensile stress is zero when $$\frac{2a}{2b}$$

is unity (1), and increases with increasing $$\frac{2a}{2b}$$

To this tensile stress along the major axis 53 may be added a compression from all sides, like a hydraulic pressure, or a tension from all sides. Such pressures or tensions, which are equal in all directions, do not change the shape of the ellipse 51'. They will be referred to as hydraulic pressures and are meant to include also negative pressures or tensions. They can be determined from the conditions of equilibrium.

Fig. 8 also shows in dotted lines an element in the shape of a cube whose sides 57 and 58 extend parallel to the major and minor axes 53 and 55 of the ellipse, respectively. Its stress is particularly simple. Outside of a hydraulic pressure, which acts equally on all sides, only sides 58 are under additional stress. It is a tension stress perpendicular to the surface element 58 depending on $$\frac{2a}{2b}$$

Likewise, of the two sides 59 and 60 parallel to the sides 57 and 58, respectively, only side 60 contains the additional stress perpendicular thereto. This stress is directly transmitted to the end face 61 and to the bond. This conclusion follows from the conditions of equilibrium of the element with triangular cross-section 59—60—61 in which side 59 is free of stress additional to the hydraulic pressure. The total stress transmitted to the end face 61 is composed of the said tension stress parallel to the axis 53 and of the hydraulic pressure which is perpendicular to the end face 61. The resultant stress has a component perpendicular to the end face 61 and one along the end face 61. The latter is the shear stress. It depends solely on the amount and direction of said additional tension stress.

Accordingly, the sheer stress at the boundary can be determined from the elastic properties of the material when its deformation is known. The deformation of the material adjacent the bond is at least approximately known. The inclination $i$ (Fig. 8) increases with increasing distance from the center. The volume of each bulge represents the displaced volume and is in direct proportion to the distance of the bulge from the center. Each bulge area, moreover, is in a nearly constant proportion to the area of the triangle 65 (Fig. 3) composed of the end tangents of the bulge profile and of the line connecting the end points. This applies at least to a considered restricted range.

Triangles 65, with areas in direct proportion to the distance from the center, mean that tan $i$ is also in direct proportion to the distance from the center. The ellipses 51' of the elements at different distances from the center can now be determined; and also the shear stresses at the bond.

It can be demonstrated mathematically that inclination $j$ of major axis 53 of the ellipse can be computed as follows:

$$\tan 2j = -\frac{2}{\tan i}$$

Also, the major and minor diameters $2a$, $2b$ and the diameter $2r$ of circle 51 have the following relationships:

If $$C = \frac{1}{1 + \frac{1}{2}\tan^2 i} + 1$$

then:

$$\left(\frac{2r}{2a}\right)^2 = \left(\frac{r}{a}\right)^2 = (1 + \frac{1}{2}\tan^2 i) \cdot (1 + C \cos 2j)$$

and $$\left(\frac{2a}{2b}\right)^2 = \left(\frac{a}{b}\right)^2 = \frac{1 - C \cos 2j}{1 + C \cos 2j}$$

Accordingly all the shear stresses can be computed at any given displacement. They can also be determined on the drawing board if desired.

*The hydraulic pressure*

The hydraulic pressure at the middle will first be determined. The shear stresses exerted on the rubber are in a direction to hold back the rubber, that is, in the direction of arrows 66 (Fig. 3). In turn the rubber exerts a stress in the opposite direction 67 on the rigid plates 42. Each half of each rubber layer, taken from the middle to its outer end, is thus subjected to strong forces extending inwardly along arrows 66. These are balanced by some force at the middle which tends to press the rubber outwardly, that is, by the hydraulic pressure force there. The outward force equals the pressure per unit area multiplied by the area. The term pressure as used here is understod to refer to the unit area.

The hydraulic pressure at the middle is equal to the sum total of the shear loads per unit length divided by the thickness of the rubber layer. It acts equally in all directions, that is, it acts also normal to the end surface of the layer and tends to support the load which compresses the laminations.

The hydraulic pressure at intermediate points may be similarly determined or estimated. Here we consider imaginary cuts or sections taken from the middle of the layer thickness up and down along the varying directions of the major axes of the ellipses 51' of the elements. The forces acting on the sides of the cut are normal to the cut and are caused by hydraulic pressure only. The variation of hydraulic pressure along such cuts is only slight on layers which are wide compared with their thickness. The average hydraulic pressure, multiplied by the thickness of the layer (not by the length of the cut), balances the force caused by the shear stresses on the upper and lower boundaries of the considered portion of the rubber layer. This portion reaches from the chosen intermediate points to the outside ends. The hydraulic pressure is at a maximum at the middle and gradually decreases toward the outside.

*Comparison of layers of different thickness*

Fig. 4 shows a rubber layer 40' which is twice as thick in its unstressed state as the layers 40 of Figs. 1 to 3. It is shown in a state of compression such that the lines $43_1$ forming bulges are inclined at their bonded bases at the same angle as the lines 43''. This is true for the outside ends and essentially also for any distance from the center. As the bulges have a larger base and a larger height they are nearly four times larger in area as compared with the bulges of Fig. 3. Accordingly, the displacement required to produce these bulges is nearly four times as large as the displacement in Fig. 3.

Since the angular deformation adjacent the bonded boundary is the same in both cases, the shear stresses are also the same. Moreover, the total load exerted by these shear stresses on the rubber layer portion 40' is also the same, when points of equal distance from the center are considered. This load is kept in balance by an opposing force caused by hydraulic pressure. It is the product of the hydraulic pressure per unit area and the thickness of the layer, both forces being measured per unit of length. In Fig. 4 the thickness of the rubber layers is nearly twice as large as is Fig. 3. Accordingly, it takes only half the previous hydraulic pressure to maintain equilibrium. The layer of double thickness of Fig. 4 thus has only about half the hydraulic pressure of the layer of Fig. 3. Hence it carries only half the load, or somewhat less, since the largest part of the load is carried by the hydraulic pressure.

Now let us compare equal aggregate rubber thicknesses. That is, let us compare layers such as shown in Fig. 4 with a composite material having double the number of layers, each half the thickness of the layers of Fig. 4. Our conclusions are then: At equal shear stresses and equal labor of the composite material, the composite material with twice the number of layers carries about double load, at that double load has half the deflection in the direction of the load at right angles to the layers, and has the same lateral softness.

*General solutions*

Thus far, layers have been considered which are very long in a direction perpendicular to the sectional plane. Other layer shapes will now be discussed. One of them particularly leads itself to mathematical analysis without undue complications. It is a construction in which the alternating layers of rubber and metal are circular. In this case, for reasons of symmetry the rubber elements in a plane stay in that plane upon compression of the rigid end plates of the laminated structures. It is a plane problem rather than a three dimensional one. Here the bulges formed at a given radius $r$ contain the volume displaced inside of the area of the circle with radius $r$. This volume is proportional to $r_2$. The bulge volume is also proportional to the bulge area and to the circumference, which latter is proportional to $r$. Dividing the two equal volumes by $r$ we find that the bulge area is proportional to the radius $r$, that is, to its distance from the center. The bulge area increases with increasing distance from the center as in the case of the construction shown in Figs. 1 to 4. Likewise, the shear stresses at the boundaries are the same at equal distances from the center.

Further analysis shows that some slight lateral tension stresses occur in the case of circular rubber laminations, these stresses extending in the peripheral direction. They are, however, practically negligible. If they are neglected, the same distribution of pressure is obtained as in the case illustrated in Figs. 1 to 4.

The conclusion reached above regarding thick and thin layers of equal aggregate thickness still holds true essentially in the case of circular laminations. It also applies essentially to other shapes for comparing layers of different thicknesses but otherwise equal shape. It should be further noted that the above conclusions do not depend on any assumption as to the exact deformation of the material adjacent the bond and as to the exact distribution of the shear stress along the bond.

Layers extending about an axis

Layers, which extend about an axis, form an important part of the present invention. These transmit main loads in a general direction radial of an axis. Figs. 5 and 6 illustrate diagrammatically the action of a composite material comprising alternate circular layers 70 of rubber and 72 of metal or other rigid, strong material. Fig. 5 shows such layers 70 and 72 under radial load. Fig. 6 shows the effect of a relative turning displacement without radial load. The conditions in practice are combinations of the two basic conditions shown.

The two figures show a rubber sleeve bearing for limited motion. It comprises an inner pin or journal 71 centered at 73, an outer rigid member 74, and an intermediate rigid sleeve 76. The circular spaces intermediate pin 71, sleeve 76 and outer member 74 are filled with rubber layers 70, natural or synthetic, or other suitable materials which are resilient, and yielding, or coherent and flexible. In this composite sleeve bearing each rubber sleeve 70 is vulcanized or bonded to the rigid parts 71, 76, 74 both on the outside and the inside to form a strong connection.

In position of rest, pin 71, sleeve 76, outer member 74, and rubber layers 70 are all centered at 73. Fig. 5 shows the mounting under radial load. Outer member 74 here has its center at 75, and sleeve 76 has its center at 77. The rubber layers are partly under tension and partly under compression, the state of the layers varying around axis 73.

The radial load extends in a direction connecting the centers 73, 75. To show up the stress in the rubber, lines 80 are drawn. These correspond to radial lines which exist in the unstressed state. These lines form bulges which hold the volume of rubber displaced through the outer force, which tends to approach pin 71, to the bore of outer member 74. Here this volume first increases with increase in distance from the central portion 80', and reaches a maximum at 80'' and then decreases again. Accordingly the bulge area is a maximum at 80''. The bulge has a maximum inclination $i$ between $80_1$ and $80''$.

The shear stresses at the boundary surface can be determined in the way above described, from the inclination $i$ of the elements which were radial in their unstressed state. Inclination $i$ and $\tan i$ are now differently distributed. But $\tan i$ is again approximately proportional to the volume of rubber displaced between the central portion 80' and the considered portion.

The increment of hydraulic pressure along the elements of the circumference toward the central portion 80' can be determined in the way described above. The pressure increment multiplied by the thickness of rubber at the considered point balances the forces caused by the known shear stress at the boundary. At the region 80' the boundary surfaces of each rubber ring have approached each other. At the opposite region $80_2$ they have receded from each other. The maximum pressure is at 80', the minimum pressure at $80_2$. The latter is usually negative, that is, it is a tension in all directions. It is a tension, at least if no preload exists when pin 71 and outer member 74 are concentric, that is, at rest. How to control this tension and to minimize it will be further shown hereafter.

The above remarks were meant primarily for very long rubber sleeve bearings. The conclusions are, however, broadly applicable. Here, too, we come to the conclusion that for the same aggregate rubber thickness, the bearing with twice as many rubber rings of half thickness carries double load and yields half as much under this double load. As to torsional relative displacements about the bearing axis, the softness remains the same. More generally and approximately, $n$ and $m$ rubber layers of equal aggregate thickness carry loads proportional to $n$ and $m$ and yield amounts proportional to $$\frac{1}{n}$$

and $$\frac{1}{m}$$

at these loads.

In the torsional relative displacement illustrated in Fig. 6 lines 85' marked on the rubber correspond to the radial lines 85 in the unstressed state. These are shown dotted. In torsion, the layers of the same aggregative thickness and the same mean diameter, as a single layer, yield just as much as the latter.

Change of scale

When a sleeve bearing or bonded layer is enlarged equally in all directions, for instance, doubled, it takes a double displacement to arrive at the same stress condition. It is found by applying the above analysis that the hydraulic pressures produced remain the same at corresponding points at this same stress condition. The load carried increases like the area, that is, four times. These data, giving comparison of large and small layers, thick and thin layers, will enable those skilled in the art to employ the laminated material to full advantage.

Stress peaks

In the rubber layers of flexible laminated mountings, the part most loaded is generally at the center. But it is loaded by all-around hydraulic pressure which does not tend to destroy the material. The part which labors most and which is apt to fail first is at the outside where the shear stresses are larger. These tend to destroy the material. The outside end has to be watched and particularly the end at the bond. I preferably let the rigid portions extend somewhat laterally or axially beyond the rubber as shown rather than keeping them flush. This is to avoid weakness at the corner.

The rigid laminations or sleeves 76 are under tension when the rubber is under compression. The tension forces are caused by the shear stresses at the bond and they extend in directions 67 (Figs. 3 and 4). They are a maximum at the center. To these tension stresses are added pressure stresses in a direction perpendicular to the layers, caused by the aforesaid hydraulic pressure. Both stresses tend to stress the relatively rigid material laterally and to make it thinner. This material is therefore highly stressed. High grade materials of great strength are neeedd.

As has been explained above, the thinner the rubber laminations, the more they can be loaded without distress up to a degree unheard of for rubber; but in so loading them, the rigid laminations are under increasingly heavy stress. They should then be thickened up as compared with the rubber layers.

Stress relation

Even when the rubber or yielding material has a linear stress-strain relationship, the relationship is not linear for the built-up material. That is, even when the deformation of the rubber used is exactly proportional to the stress, the amount of overall compression is not directly proportional to the load. On the whole it takes more load increase for a given increase in deformation at large loads than at small loads. I have discovered that the deformation characteristics can be influenced by the profile shape of the rubber layer at its ends, referring to the unstressed state or zero load.

Figure 9:
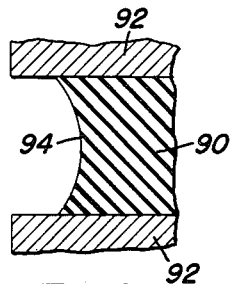
Fig. 9 is a fragmentary, enlarged section showing a small portion of a stratified connection constructed according to one embodiment of the invention at zero load.

Fig. 9 shows a laminated mounting, comprising the two rigid layers 92 and an intermediate rubber layer 90, at zero load. Here the rubber layer 90 has an end profile 94 which is concave. This profile may readily be obtained. It results naturally from shrinkage and from the natural affinity between the treated metal surfaces 92 and the intermediate rubber 90. This affinity attracts the rubber and tends to spread it along the metal surfaces of layers 92.

Figure 10:
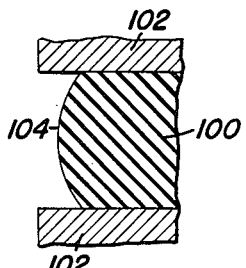
Fig. 10 is a similar section showing a modified construction in which the rubber layers are shaped in such way that tensile stresses set up upon separation of the rigid layers are reduced.
Figure 12:
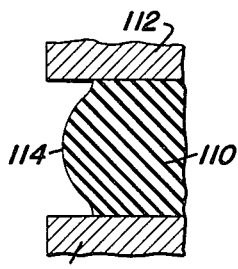
Fig. 12 is a fragmentary section similar to Figs. 9 and 10 illustrating a further modification of the invention at zero load in which the resilient material is shaped in such way that tensile stresses set up upon separation of the rigid layers are reduced.

Figs. 10 and 12 show other profile shapes for the rubber laminations at zero load. In the case shown in Fig. 10, the rubber layer 100 lies between two rigid metal layers 102; and the rubber layer 100 has a convex end profile 104 which bulges out even at zero load as shown. In the case shown in Fig. 12 the rubber layer 110 is mounted between two metal layers 112; and the rubber layer 110 has a slightly modified generally convex profile 114 having an outward bulge at zero load.

The convex profile shape can be attained in two ways. One way consists in not treating the rigid surfaces 92 for bonding to the very ends of those surfaces, but screening the ends, so that they remain untreated. The untreated surfaces have no attraction for the rubber in the molding operation, and rather tend to repel the rubber. The rubber then tends to bulge out. The other way consists in shaping the mold to form the convex profile shape, allowing also for shrinkage.

While the outward bulge in the cases shown in Figs. 10 and 12 tends to stiffen up the composite material in compression it renders it softer in tension. This is very desirable especially so in radially-loaded bearings or bushings for there, together with compression on one side at 80' (Fig. 5), goes tension at the opposite side at $80_2$. Laminated mountings such as shown in Figs. 5 and 6 can take a great deal of compression but they are limited in tension. The bond itself is a limit. While the bond can stand much tension this amount does not compare with the amount of compression the laminated bearing can take. Accordingly the tension should be kept down. The convex profiles 104 and 114 do this.

Figure 11:
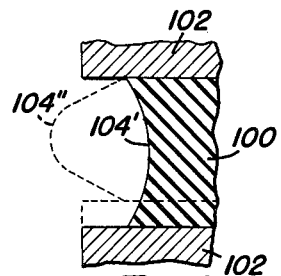
Fig. 11 is a fragmentary section showing the embodiment of Fig. 10 in separated position in full lines and in compressed position in dotted lines.

Fig. 11 shows how a laminated mounting with rubber layers of convex end profile acts in use. The end 104 of the lamination 100 is shown in tension in full lines at 104'. The rigid layers 102 has been separated as compared with their positions in Fig. 10. The layer 100 accordingly has contracted laterally and now shows an inward bulge with a concave profile 104'. In this change the hydraulic action is only moderate. Accordingly, the tension stress is not excessive. It should also be noted that the profile 104' is only slightly longer than the profile 104. The dotted lines show the profile of the rubber layer 100 under compression. The rigid layers 102 have been approached to one another. The profile 104" now bulges out much more sharply than the original profile 104 in Fig. 10. In this position the hydraulic action has a substantial effect. It causes the overall load to be much larger than the opposite load in the full line position, at equal and opposite displacements from the position at zero load.

Profiles such as shown in Figs. 10 and 12 are preferably incorporated in the embodiments hereinafter to be described, but cannot be shown on the small scale of the figures.

Specific embodiments

Figure 13:
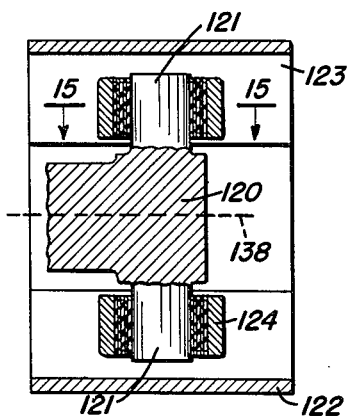
Fig. 13 is an axial section of one form of universal joint constructed according to the present invention, the shafts connected by the joint being shown in axial alignment.
Figure 14:
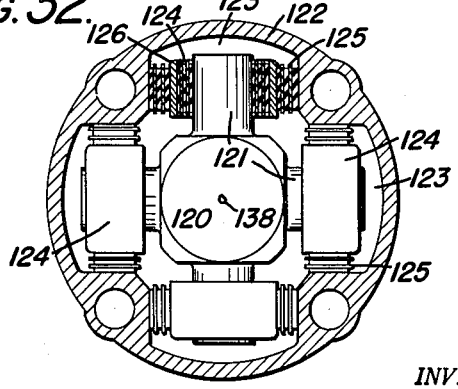
Fig. 14 is a section through this joint taken at right angles to the section of Fig. 13.

Figs. 13 and 14 show a universal joint constructed according to one embodiment of the present invention with the axes of the two connected parts in aligned position. One end member of the joint is a spider 120 having a plurality of radially disposed pivots or pins 121. In the case shown the spider has four pivot pins 121 disposed in equi-angular spaced relationship about the axis of the spider. The other end member 122 of the joint has axially-extending pockets or recesses 123 into which the pivot pins 121 project. The end members are yieldingly connected by laminated connections made according to the present invention which connect pins 121 with pockets 123.

Separate laminations 124 and 125 are used for the pivotal motion on pivots 121 and for the general endwise rocking motion. In the embodiment illustrated in Fig. 15 the equivalent of sliding blocks 126 are used for the pivotal motion on pins 121. Each block 126 is mounted on a pivot pin 121 by a laminated bearing 124. The latter comprises a plurality of sleeves or rings 127 of rubber which are separated by more rigid and stronger sleeves or rings 128. Each rubber sleeve is bonded on the inside and the outside to the adjoining surfaces of the more rigid rings 128; and the innermost rubber sleeve 127 is bonded on the inside to pin 121 and on the outside to innermost ring 128, while the outermost rubber sleeve 127 is bonded on the outside to block 126, which is formed with a bore to receive the same, and is bonded on the inside to the outermost ring 127.

The sides 130 of the blocks 126 are connected with the sides 132 of the recesses or pockets 123 by the laminated connection 125. Each such connection comprises the rubber layers 133 and the rigid plates or sheets 134, all vulcanized or bonded together as well as to the sides 130 and 132.

Figure 15:
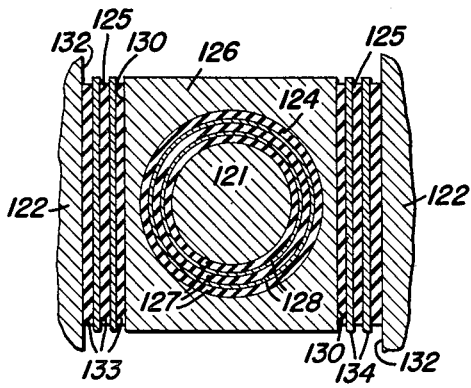
Fig. 15 is an enlarged section of this joint taken on the line 15—15 of Fig. 13 looking in the direction of the arrows, and showing the joint at zero load.
Figure 16:
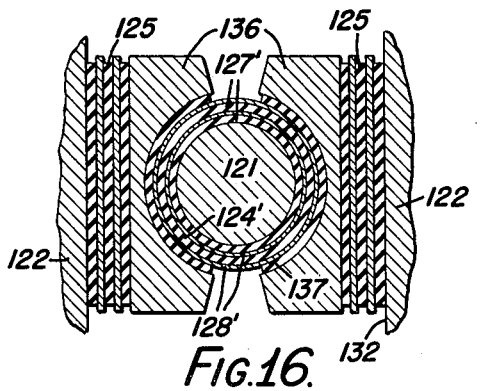
Fig. 16 is a section similar to Fig. 15 but showing a slightly modified structure.

Fig. 16 shows a modification of the invention in which a split block 136 is used in place of a solid block 126. Splitting the block makes it easier to preload both laminated connections 124' and 125. Preloading helps to avoid dangerous tension stresses. Here the inner layers of rubber of connection 124' may be rings 127' just as in Fig. 15, but the outer layer is preferably made of split arcuate collars 137. The two sections of the block 136 may be mounted from the side walls 132 of the pockets 123 by laminated mountings 125 just as shown in Fig. 15.

Figure 17:
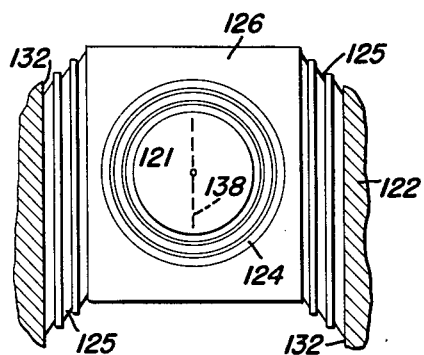
Figs. 17, 18 and 19 are fragmentary sections taken in a plane parallel to the plane of Fig. 15 showing different positions of the joint at shaft angularity but with zero load.
Figure 18:
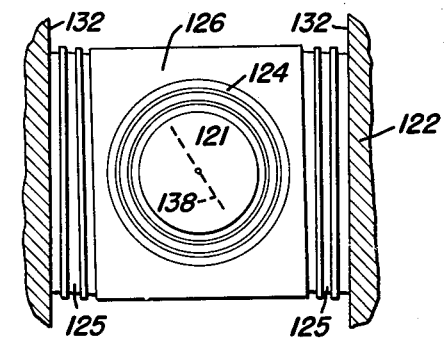
Figure 19:
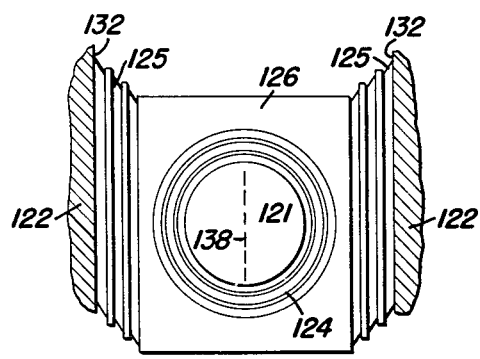

Figs. 17 to 19 inclusive show the action of the yielding connection at shaft angularity. Figs. 17 and 19 show opposite end positions. Fig. 18 shows the central position of the block 126 (136). The pivot pin 121 of spider 120 is here turned relatively to the sides 132 of the recess 123 like the axis 138 of the spider. The block 126 turns on its laminated bearing 124 through almost the same angle as between the axes of the end members 120 and 122, and is tipped only very slightly in the sides 132. This is because the bearing 124 is as soft in torsion as if all the rubber were in a single layer while laminations 125 are relatively hard to normal loads and normal moments. In the positions of Figs. 17 and 19 the axis 138 is parallel to the plane sides 132 and there is no torsional load on the rubber bearing. However the block 126 is shifted along the sides 132. This shift puts the rubber in the laminated connections 125 under shear stress, which is moderate because the laminations are soft in shear. This universal joint can be run dry which is important.

Figure 20:
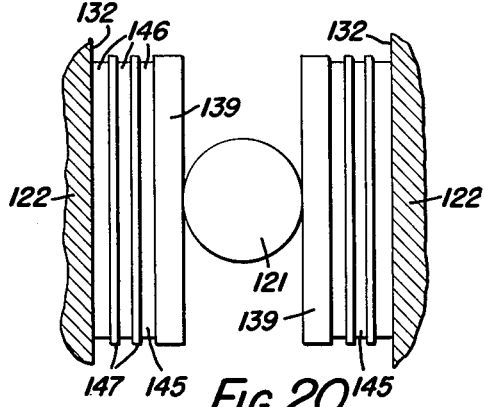
Fig. 20 is a section showing a further modification of the invention in a position similar to Fig. 15.

In the modification shown in Fig. 20 the pivots or pins 121 of the spider roll directly on side plates 139. These are yieldingly secured to the sides 132 of the pockets in the end member 122 of the joint. The connection is effected by laminations 145 comprising rubber layers 146 and rigid intermediate plates or sheets 147, all bonded together including sides 132 and side plates 139. In operation at shaft angularity the pin 121 rolls on the side plates 139 under driving load and moves the side plates back and forth along the sides 132.

Figure 21:
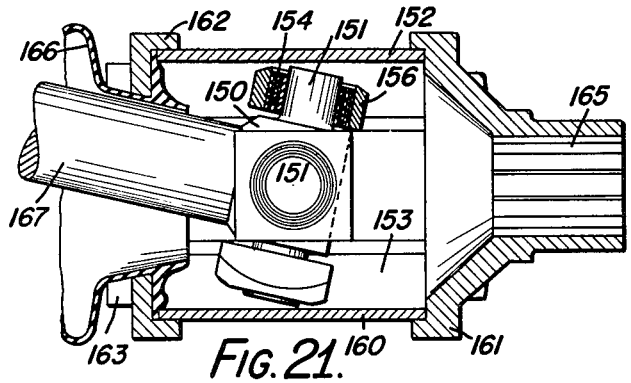
Fig. 21 is an axial section of a universal joint constructed according to a still further modification of the invention.
Figure 22:
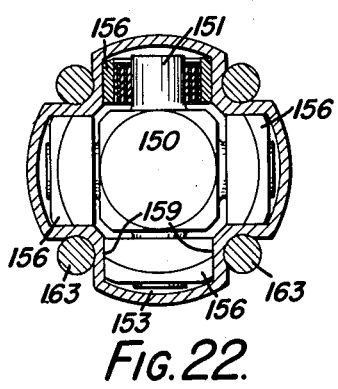
Fig. 22 is a section through the joint taken at right angles to the section of Fig. 21 but showing the parts, which are connected by the joint, in axial alignment.

Figs. 21 and 22 illustrate a further embodiment of the invention. One end member of the joint shown in these figures is a spider 150 having four equi-angularly spaced, radially disposed pins or pivots 151. The spider is shown at shaft angularity in Fig. 21 and in axial alignment with end member 152 in Fig. 22. On each of the pivots 151 is mounted a sliding block 156 by means of a laminated bearing 154 constructed according to this invention. The sliding blocks engage straight ways 153 provided in the end member 152 of the joint. The ways 153 contain plane sides 159.

End member 152 is built up of an intermediate tubular portion 160 which contains the ways 153, and end parts 161 and 162 all secured together rigidly by means of bolts 163. Part 161 contains an internally splined portion 165 adapted to be secured to a shaft. A seal 166 is bonded to the part 162 in known manner. The spider 150 is integral with a shaft 167.

My laminated bearing for pivotal motion is well suited for this application. It has a large load capacity, and yet it is capable of yielding sufficiently to permit the use of multiple pivot axes at the shaft angularity for which it is designed. This could not be done with rigidly mounted sliding blocks. Also this joint transmits more nearly uniform motion than the conventional Cardan joint.

Figure 23:
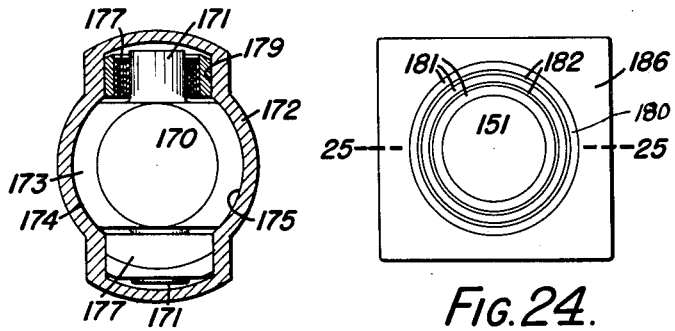
Fig. 23 is a section, similar to Fig. 22, of a still further modified form of universal joint constructed according to the present invention and having only a single pair of coaxial sliding blocks.

However my invention is not confined to multiple pivot axes. A joint with a single pair of coaxial pivots and a single pair of sliding blocks is shown in Fig. 23. Here it is required to center the joint lengthwise of the pivot axis. Here one end member of the joint comprises a part 170 which has two diametrically opposite pivot pins 171. The other end member is denoted at 172. Here centering of one end member on the other may be accomplished by providing the end member 170 with a portion 173 that contains the two diametrically-opposed pivots 171 and which has a spherical outer surface 174 that engages the cylindrical inside surface 175 of the other end member 172. As before, the end member 172 is provided with plane sided ways 179, and the pivots 171 carry laminated blocks 177 which engage with these plane ways. The blocks 177 may be made in the same manner as the blocks previously described.

My laminated rubber bearing for pivotal motion can also be used on conventional universal joints. It has sufficient load capacity to carry the high loads; and it does give some cushioning effect. It is relatively simple in construction and has only a moderate torsional reaction when designed with a sufficient amount of rubber. Also it needs no lubrication. The preferred application of the invention, however, is with multiple pivot axes.

The various designs of laminated bearings for use in universal joins in accordance with the present invention will now be described. These bearings are shown as applied to the joints of Figs. 21 to 23 inclusive.

Figure 24:
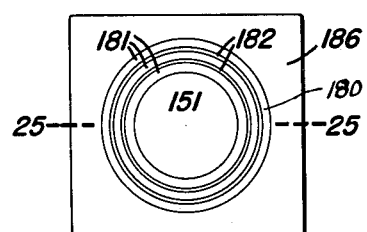
Fig. 24 is a view of a sliding block such as may be used in the joint of Figs. 21 to 23 inclusive, on a larger scale, the view being taken along the pivot axis of the sliding block.

The laminated bearing 180 shown in Figs. 24 and 25 comprises three concentric rubber sleeves or rings 181 separated by two relatively rigid sleeves 182, all vulcanized or bonded together and to the pivot pin 151 as well as to the cylindrical inside surface 183 of the sliding block 186. The ends of the rubber sleeves are preferably provided with convex profiles such as shown in Fig. 10.

In one procedure for making the bearing of Fig. 24 the rubber for all sleeves 181 is simultaneously admitted from the outside end of the bearing. The block 186 and the rigid sleeves 182 are held in place concentric with pivot 151 by clamping them on a form which is split for removal after the operation. Preferably the pivot axis is kept vertical in the operation with a pivot, which is being worked on, in its lowest position, at least when the pivots of the end member are successively treated.

Figure 26:
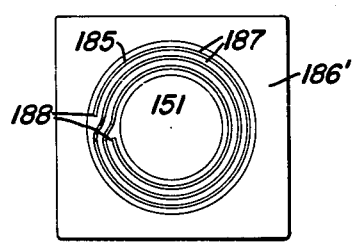
Figs. 26 and 27 are views, similar to Fig. 24, showing sliding blocks built according to further modifications of the invention.

The rubber bearing shown in Fig. 26 contains a part 185 of relatively rigid material. This part is open at both ends 188 which are adjacent and which are displaced through a right angle to the general direction of the load. The latter is assumed to be vertical in the figure. Part 185 splits up the rubber 187 into generally circular portions and is bonded to the rubber on the inside and on the outside. The rubber is also bonded to the outside surface of the pivot 151 and to the bore of the block 186'.

Figure 27:
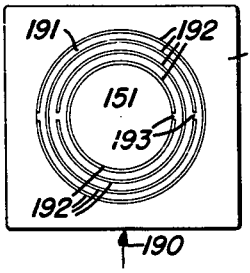

In the embodiment of the invention illustrated in Fig. 27, the mounting comprises a rubber sleeve 191 in which is embedded a plurality of radially-spaced, circular arcuate parts 192 of relatively rigid material, each of which extends for slightly less than a full circle and has its ends spaced from one another. The ends of the segments are preferably positioned ninety degrees away from the general direction 190 of the load.

The embodiment shown in Fig. 28 differs from the one shown in Fig. 25 in that the laminated bearing is sealed off from outside lubricant. The rubber used then need not be resistant to this lubricant. Soft natural rubber may be used. Here, the block 196 has a circular seat with a dovetailed boundary 194. The outside is sealed off by a cover 195 which is convex and generally spherical. The diameter of the cover is small enough to pass the dovetail 194 before the cover is pressed into block 196, and the cover is more convexly curved in its normal state than after it is pressed into the block 196. Pressure is exerted to flatten the cover out whereby its outside periphery extends into the dovetail portion 194 and provides a good seal. At the inner end of the block a circular seal 198 of a rubber resistant to the outside lubricant is bonded to the block 196 and to the body 150 from which the pivot pin 151 projects. The bond may be of any suitable kind which makes the seal adhere to the surfaces of the body and block. In this way the outside lubricant used on the sliding block is kept away from the rubber bearing. The block 196 is connected as before with pin 151 by a laminated connection comprising alternate resilient and rigid layers bonded to one another and to pin 151 and block 196.

Fig. 29 illustrates an embodiment in which the cover is formed integral with the sliding blocks 206. Here, also, a seal 205 is used between the block and the body 150 from which the pivot pin 151 projects. This is put on after the composite bearing is made. Rubber 204 fills the whole outer end of the block cavity. To prevent undue stresses the sleeves 202 of relatively rigid material have a well rounded profile at their outsides without sharp corners. Rubber is first introduced into the cup 200 whose outside surface is the bore of the block 206. This cup is then approached vertically along the pivot axis of the pivot pin 151 and the sleeves 202 which are held in position by a split holder.

Figs. 32 and 33 illustrate an embodiment in which the sliding block 216 is put on after the composite bearing is completed. The rubber 215 is bonded to the outside surface of the pivot 151 and to the split generally circular, strong, rigid, coaxial parts 112. These parts have open ends. In assembly the circular sandwich is compressed on its pivot 151 while the block 216 is forced over it.

Preferably the outer part of the sandwich which may be a rigid metal part, is also bonded to the bore of the block. It may be cemented thereto or otherwise made to adhere and to add to the connection effected by the preload.

Figs. 30 and 31 illustrate slightly modified embodiments of the invention in which a single rubber sleeve is used. Its load capacity is increased over the load capacity of a plain sleeve in accordance with my invention by providing convex end profiles. In the embodiment shown in Fig. 30, the rubber sleeve 224 has convex end profiles 222 in sections containing the sleeve axis and the axis 223 of the pivot pin. As explained above, this increases the load capacity in compression while also reducing the tension stresses in the opposite region. The crest of the end profile bulges out over the bonded ends an amount at least half the sleeve thickness.

Another feature shown by these two figures is the taper of at least the middle portion in a direction to increase the width of the rubber sleeve toward the outside. This tends to make the outer portion of the sleeve softer where the block 226 or 236 has to give more under load. In Fig. 30 this taper is accomplished by a slightly tapered bore 227 in block 226. In Fig. 31 the taper is put on the pivot portion 151' of the spider 150'. Also the ends 232 of the sleeve 234 are turned outwardly by curving the profiles of the pivot and of the inside surface of the block 236, as shown at 237 and 238, respectively, to hold the block more rigidly in axial direction. The blocks 226 and 236 may be used as shown in Fig. 21 to slide in ways 153 and connect spider 150 with end member 152.

It should be understood that the term rubber is used in this specification and in the claims in its broadest sense, and that it is meant to include natural and synthetic rubbers of all kinds and broadly substances which are flexible and resilient to a degree required to carry out their described function.

While the invention has been described in connection with several different embodiments thereof, moreover, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A universal joint comprising two end members, one end member having a plurality of radial pivot portions with intersecting axes, a part mounted on each of said pivot portions, rubber interposed between each said part and the associated pivot portion and bonded to both, and means operatively connecting all said parts to the other end member, the rubber associated with each pivot portion being split up into generally circular portions of different mean radii, and a generally circular part of relatively rigid material interposed between each pair of adjacent generally circular portions of the rubber, each of said last-named generally circular parts being bonded to the associated adjacent rubber portions both at its outside and its inside, and floating freely in the rubber, being held by the rubber only.

2. A universal joint for connecting two elements having angularly disposed axes, said joint comprising two end members rigid with said two elements, respectively, one end member comprising a spider having a plurality of radially extending pivots with intersecting axes, the other end member having a plurality of axially-extending guideways equal in number to the number of said pivots, a part engaging each said guideway, each of said parts being bonded to a rubber bearing which is bonded to one of said pivots, the rubber in each bearing being split up into generally circular portions of different mean radii, and a generally circular part of relatively rigid material interposed between and bonded on its inside and its outside to each pair of adjacent generally circular rubber portions, and floating freely in the rubber, being held by the rubber only.

3. A universal joint comprising two end members coaxial, respectively, with the two axes of the joint, one end member having a plurality of radially-disposed pivot portions, a block mounted on each pivot portion, rubber interposed between each said block and its associated pivot portion and bonded to said block and to said pivot portion, and rubber interposed between said block and the other end member and bonded to said block and said other end member.

4. A universal joint comprising two end members coaxial, respectively, with the two axes of the joint, one end member having a plurality of radially-disposed pivot portions, each of which has an outside surface, a block mounted on each pivot portion, each block having a bore with an inside surface surrounding the outside surface of the associated pivot portion, means connecting each pivot portion to its associated block comprising a plurality of layers of rubber interposed between the inside surface of each block and the outside surface of the associated pivot portion, and a layer of relatively rigid material interposed between and bonded to each pair of adjacent rubber layers, the other end member having a plurality of slots, equal in number to the number of pivot portions, each block being mounted in one of said slots, and means connecting each block to the associated slot comprising a plurality of layers of rubber interposed between each block and both sides of the associated slot, and a layer of relatively rigid material interposed between and bonded to each adjacent pair of the last-named rubber layers.

5. A universal joint comprising two end members coaxial, respectively, with the two axes of the joint, one end member having a plurality of radially-disposed pivot portions that have different axes intersecting the axis of said one end member, each of said pivot portions having an outside surface, a block mounted on each pivot portion, each block having a bore with an inside surface surrounding the outside surface of the associated pivot portion, a plurality of layers of rubber interposed between the inside surface of each block and the outside surface of the associated pivot portion, the outermost rubber layer being bonded to said block and the innermost rubber layer being bonded to the associated pivot portion, a layer of relatively rigid material interposed between and bonded to each pair of adjacent rubber layers, and the other end member having a plurality of slots, equal in number to the number of pivot portions, each block being mounted in one of said slots, a plurality of layers of rubber interposed between each block and both sides of the associated slot, and a layer of relatively rigid material interposed between and bonded to each adjacent pair of the last-named rubber layers, the innermost of the last-named rubber layers being bonded to said block and the outermost of said last-named rubber layers being bonded to the sides of said slots.

6. A universal joint comprising two end members coaxial, respectively, with the two axes of the joint, one end member having a plurality of radially-disposed pivot portions, each of which has an outside surface, a block mounted on each pivot portion, each block having a bore with an inside surface surrounding the outside surface of the associated pivot portion, a plurality of layers of rubber interposed between the inside surface of each block and the outside surface of the associated pivot portion, a layer of relatively rigid material interposed between and bonded to each pair of adjacent rubber layers, the other end member having a plurality of slots, equal in number to the number of pivot portions, each block being mounted in one of said slots, a plurality of layers of rubber interposed between each block and both sides of the associated slot, and a layer of relatively rigid material interposed between and bonded to each adjacent pair of the last-named rubber layers, both the first-named and the last-named rubber layers being bonded to the sides of the parts between which they are interposed.

References Cited in the file of this patent

UNITED STATES PATENTS

| | | |
|---|---|---|
| 1,456,068 | Lord | May 22, 1923 |
| 1,966,486 | Cutting | July 17, 1934 |
| 2,069,270 | Piron | Feb. 2, 1937 |
| 2,126,704 | Schmidt | Aug. 16, 1938 |
| 2,187,706 | Julien | Jan. 16, 1940 |
| 2,195,647 | Guy | Apr. 2, 1940 |

FOREIGN PATENTS

| | | |
|---|---|---|
| 532,393 | Great Britain | 1941 |